(12) United States Patent
Baek et al.

(10) Patent No.: US 8,374,593 B2
(45) Date of Patent: Feb. 12, 2013

(54) METHOD OF PROVIDING MOBILE APPLICATION

(75) Inventors: Wonjang Baek, Seongnam-si (KR); John Kim, Seoul (KR); Seong Baek Lee, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 511 days.

(21) Appl. No.: 12/450,273

(22) PCT Filed: Mar. 21, 2008

(86) PCT No.: PCT/KR2008/001618
§ 371 (c)(1),
(2), (4) Date: Sep. 18, 2009

(87) PCT Pub. No.: WO2008/115033
PCT Pub. Date: Sep. 25, 2008

(65) Prior Publication Data
US 2010/0112995 A1    May 6, 2010

(30) Foreign Application Priority Data

Mar. 22, 2007  (KR) .................. 10-2007-0027896

(51) Int. Cl.
*H04M 3/00*    (2006.01)
*H04W 4/00*    (2009.01)
(52) U.S. Cl. ........................ 455/418; 455/466
(58) Field of Classification Search ............... 455/414.2, 455/456.3, 418, 452.1, 466, 406; 370/352, 370/338, 328, 329
See application file for complete search history.

(56) References Cited

U.S. PATENT DOCUMENTS

2006/0293065 A1* 12/2006 Chew et al. ............... 455/456.3
2007/0270133 A1* 11/2007 Hampel et al. ............ 455/414.2

FOREIGN PATENT DOCUMENTS

KR    10-2005-0117943 A    12/2005
KR    10-0568999 B1         4/2006

* cited by examiner

*Primary Examiner* — Michael Faragalla
(74) *Attorney, Agent, or Firm* — Stein McEwen, LLP

(57) ABSTRACT

A method of providing a mobile application is disclosed. In accordance with the method of the present invention, a transmission time and a loading time of the mobile application, and a limitation on a number and a size of the mobile application are minimized, and providing the personalized mobile application is possible.

10 Claims, 3 Drawing Sheets

METHOD OF PROVIDING MOBILE APPLICATION

TECHNICAL FIELD

The present invention relates to a method of providing a mobile application, and more particularly to a method of providing a mobile application that minimizes a transmission time and a loading time of the mobile application, and a limitation on a number and a size of the mobile application, and is capable of providing the personalized mobile application.

BACKGROUND ART

As a processing performance of a mobile communication terminal is improved, the mobile communication terminal is capable of executing various applications.

For instance, an application provider creates the application based on an execution environment such as WIPI, SKVM and GVM. A user of the mobile communication terminal connects to a mobile communication network to download the application to the mobile communication terminal. The mobile communication terminal executes the application based on the execution environment such as WIPI, SKVM and GVM to provide the application to the user.

Hereinafter, the application executable in the mobile communication terminal is referred to as a "mobile application".

Hereinafter, a mobile application providing server refers to a system of a mobile communication provider that transmits the mobile application to the mobile communication terminal through the mobile communication network or a system of a mobile application provider.

Hereinafter, the mobile communication terminal hereinafter refers to a terminal for receiving the mobile application from the mobile application providing server and executing the received mobile application, which provides the execution environment for the mobile application such as WIPI, SKVM and GVM.

A conventional method for providing the mobile application has following drawbacks.

Firstly, a limitation due to limited resource of the mobile communication terminal exists.

Although latest mobile communication terminals has a high performance, a size of the mobile application that may be stored in the mobile communication terminal and a size of the mobile application that may be processed by the mobile communication terminal are limited.

Secondly, a limitation due to a limited bandwidth of the mobile communication network exists.

The bandwidth provided by the mobile communication network is limited. Therefore, the mobile application provider should optimize a configuration of the mobile application such that the user of the mobile communication terminal may receive the mobile application in a short time. That is, the mobile application provider should minimize a screen configuration or an image configuration of the mobile application such that the mobile application is optimized for the bandwidth of the mobile communication network. Therefore, the mobile application provider cannot use various configurations when creating the mobile application.

Accordingly, a provision of the mobile application for processing various functions is suppressed, and only a simple game mobile application having a small size is provided.

Moreover, a time required to load the mobile application in the mobile communication terminal after a selection of the mobile application by the user is excessively long.

That is, since an entirety of the mobile application is received through the mobile communication network and is loaded as a whole, a time required for an execution of the mobile application is excessively long.

DISCLOSURE OF INVENTION

Technical Problem

It is an object of the present invention to provide a method for providing a mobile application that minimizes a transmission time and a loading time of the mobile application and a limitation on the number and a size of the mobile application, and that is capable of providing a personalized mobile application based on a mobile communication terminal information or a user information.

Technical Solution

In order to achieve above-described object of the present invention, there is provided a method for providing a mobile application in an mobile application providing server for providing the mobile application, the method comprising steps of: (a) dividing the mobile application into a plurality of execution data and storing the plurality of execution data; (b) receiving an application requesting event transmitted from a mobile communication terminal, the mobile communication terminal executing and providing the mobile application; (c) extracting one of the plurality of execution data to be provided to the mobile communication terminal, the extracted execution data corresponding to the application requesting event; and (d) transmitting the extracted execution data to the mobile communication terminal.

Preferably, each of the plurality of the execution data includes at least one of an executable code, a display data and a resource data for a scene of the mobile application.

Preferably, the step (b) comprises: (b-1) receiving the application requesting event including at least one of a device identification information of the mobile communication terminal, a user identification information of the mobile communication terminal and an identification information of the execution data.

Preferably, the step (c) comprises (c-1) extracting one of the plurality of the execution data based on at least one of the device identification information, the user identification information and the identification information of the execution data.

In accordance with the method of the present invention further comprises (e) storing a plurality of control profiles including a plurality of control nodes corresponding to a plurality of scenarios for the application requesting event prior to carrying out the step (b), and the step (c) comprises (c-2) extracting one of the plurality of the execution data based on one of the plurality of control profiles corresponding to the application requesting event.

Preferably, the control node includes an identification information for one of the plurality of the execution data.

Preferably, a first control node included in a first control profile of the plurality of control profiles is associated with one of: the execution data corresponding the first control node; a second control profile of the plurality of control profiles different from the first control profile; and a second control node included in the second control profile different from the first control node.

Preferably, each of the plurality of the control profile or each of the plurality of the control node is represented by an identifier, and the association is represented in a form of a link to the identifier.

There is also provided a method for providing a mobile application in a mobile communication terminal for receiving providing the mobile application, the method comprising steps of: (a) generating an application requesting event corresponding to an initial execution data of the mobile application for executing the mobile application; (b) transmitting the application requesting event to a mobile application providing server for providing the mobile application; (c) receiving the initial execution data corresponding to the application requesting event from the mobile application providing server and executing the received initial execution data; (d) generating an additional application requesting event for requesting an additional execution data required during the execution of the initial execution data; (e) transmitting the additional application requesting event to the mobile application providing server; and (f) receiving the additional execution data of the mobile application corresponding to the additional application requesting event from the mobile application providing server and executing the received additional execution data.

Preferably, each of the application requesting event and the additional application requesting event includes at least one of a device identification information of the mobile communication terminal, a user identification information of the mobile communication terminal and an identification information of the execution data.

Preferably, the initial execution data includes at least one of an executable code, a display data and a resource data for an initial screen of the mobile application.

Preferably, the additional execution data includes at least one of an executable code, a display data and a resource data for an additional screen to be displayed according to a user input during the execution of the mobile application based on the initial execution data.

Advantageous Effects

As described above, the method for providing the mobile application in accordance with the present invention is advantageous in that the transmission time and the loading time of the mobile application and the limitation on the number and the size of the mobile application are minimized, and the personalized mobile application may be provided based on the mobile communication terminal information or the user information.

DESCRIPTION OF THE REFERENCE NUMERALS

Figure 1:
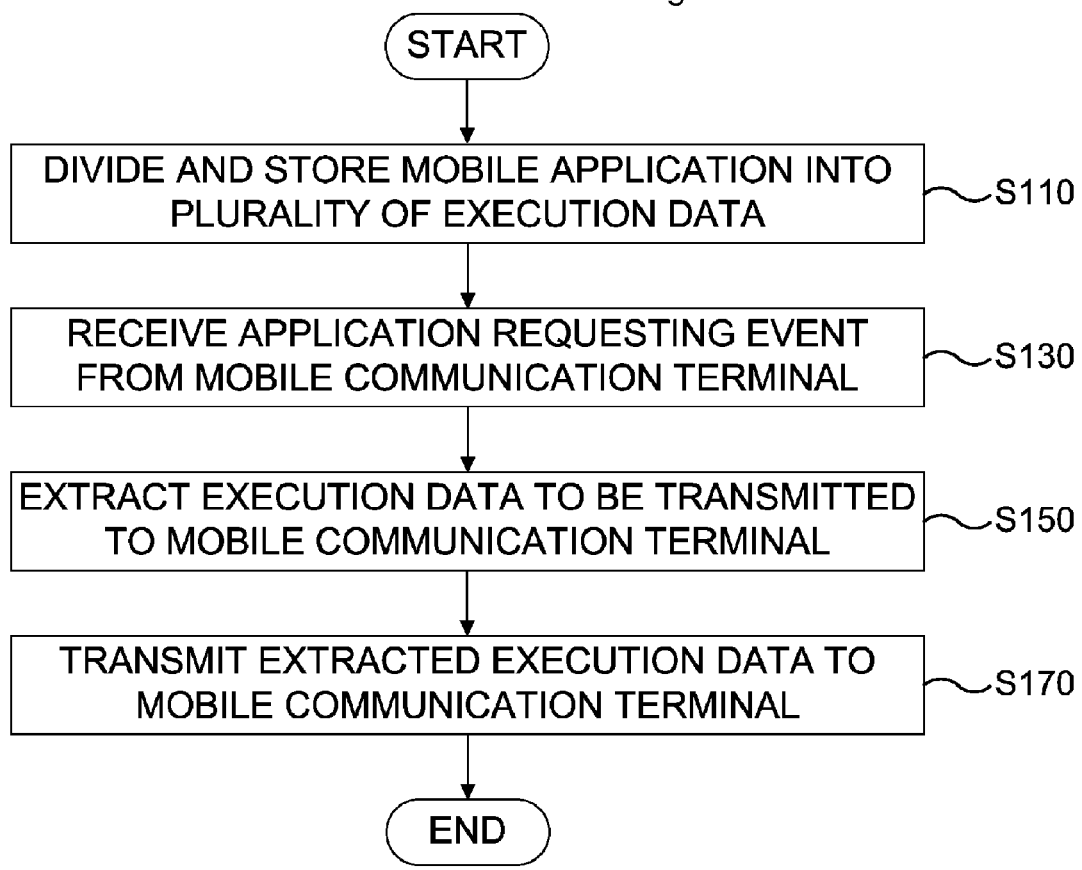
FIG. 1 is a flow diagram exemplifying a method for providing a mobile application in accordance with the present invention.

110: data 130: control profile
135: scenario 210: model
213: property 216: control profile dispatcher

BEST MODE FOR CARRYING OUT THE INVENTION

A method for providing a mobile application in accordance with the present invention will now be described in detail with reference to the accompanied drawings.

FIG. 1 is a flow diagram exemplifying a method for providing a mobile application in accordance with the present invention wherein the method is embodied in a mobile application providing server.

Referring to FIG. 1, the mobile application providing server divides the mobile application into a plurality of execution data and stores the plurality of execution data (S110).

Each of the plurality of the execution data may include an executable code, a display data or a resource data for each scene of the mobile application.

The executable code is an independently executable code to correspond to the scene. That is, the executable code is independently executable for each scene contrary to that of the conventional art that is executable for the entirety of the mobile application. Therefore, the executable code is required for each scene of the mobile application.

The display data is an element displayed on a screen when a mobile application is executed wherein a plurality of scenes corresponding to a user input are divided and stored according to the user input for each scene.

The resource data refers to a data that may be additionally displayed such as a control box, a text box and an image other than the display data.

In accordance with the conventional art, the executable code, the display data and the resource data are integrated into the mobile application. Therefore, the entirety of the mobile application transmitted from the mobile application providing server to the mobile communication terminal. However, in accordance with the present invention, the mobile application is stored by dividing into the display data or the resource data, the executable code for executing the display data or the resource data instead of being stored as a whole.

Since the mobile application is stored as the plurality of the execution data, the transmission and the execution per execution data are possible.

Although not shown, the mobile application providing server may store, in advance, a control profile for extracting the execution data to correspond to storing the plurality of execution data constituting the mobile application.

The control profile defines a scheme on extracting the plurality of execution data stored in the step S110 to correspond to the application requesting event.

The control profile may include a plurality of control nodes for each mobile application.

For instance, a control profile A is stored for a mobile application A and a control profile B is stored for a mobile application B.

The control profile includes the plurality of control nodes corresponding to the plurality of scenarios for the application requesting event. The execution data to be transmitted is extracted based on the corresponding control node.

In addition, the control profile may be configured based on a user group information in order to provide a personalized service.

For instance, a control profile C may be stored for a user group C and a control profile D may be stored for a user group D.

The control profile based on the user group information may be configured to extract the execution data to be transmitted to the mobile communication terminal, and be used in order to embody the personalized mobile application.

Moreover, the control node includes an identification information of the execution data corresponding to the control node, and is configured to extract the execution data based thereon.

The extraction of the execution data based on the control profile and the control node will be described in latter portion of specification.

In addition, a first control node may be associated with the corresponding execution data in order to extract the execution data to be transmitted to the mobile communication terminal.

Moreover, the first control node included in a first control profile may be associated with a second control profile.

In addition, the first control node included in the first control profile may be associated with a second control node included the second control profile.

The association may be embodied by expressing the control profile or the control node as an identifier and representing the identifier as a link.

A detailed description will be given with reference to FIG. 4. When a configuration wherein a first control node included in a first control profile is associated with a second control profile or a second control node in the second control profile is employed, the limitation of the conventional art may be overcome. Therefore, the limitation on the size and the number of the mobile application executed in the mobile communication terminal is minimized.

Thereafter, the application requesting event is received from the mobile communication terminal that executes and provides the mobile application (S130).

The application requesting event is generated by the mobile communication terminal. The application requesting event is a request for the execution data provided by the mobile application providing server in order to execute the mobile application.

In order to provide the execution data from the mobile application providing server to the mobile communication terminal, an information of a user or the mobile communication terminal is required.

Therefore, the application requesting event may include at least one of a device identification information and a user identification information of the mobile communication terminal.

In addition, the mobile communication terminal may request the execution data for another scene while executing the execution data of the mobile application, i.e. while executing the mobile application based on a scene data. In such case, the mobile application providing server provides the corresponding data to the mobile communication terminal.

In order to achieve this, the application requesting event includes an information on the execution data to be received, i.e. an identification information of the execution data.

Thereafter, the mobile application providing server extracts one of the plurality of execution data, which is to be transmitted to the mobile communication terminal, stored in the step S110 to correspond to the application requesting event received in the step S130 (S150).

For instance, when the application requesting event includes at least one of the device identification information, the user identification information and the identification information of the execution data, the mobile application providing server extracts the execution data to be provided to the mobile communication terminal based on at least one of the informations.

When the control profile is stored, the execution data is extracted based on the control profile.

The extraction of the execution data is described in detail below.

In case that the control profile is stored for each mobile application, the application requesting event includes at least one of the device identification information of the mobile communication terminal, the user identification information of the mobile communication terminal, a user input information and the identification information of the execution data.

Therefore, the mobile application providing server extracts the execution data received in the step S130 by comparing the device identification information, the user identification information, the user input information or the identification information included in the execution data with the control node included in the control profile based on the mobile application.

The similar may be applied to the control profile classified according to the user group.

Thereafter, the mobile application providing server transmits the execution data extracted in the step S150 to the mobile communication terminal (S170).

While the entirety of the mobile application is transmitted from the mobile application providing server to the mobile communication terminal in accordance with the conventional method, only the execution data extracted is transmitted in accordance with the present invention.

The mobile communication terminal executes and provides the execution data transmitted by the mobile application providing server. Thereafter, when the mobile communication terminal requires an additional execution data, the mobile communication terminal again transmits the application requesting event to the mobile application providing server in the step S130. The mobile communication terminal then receives the corresponding additional execution data and provides the received execution data to the viewer.

Therefore, the disadvantages of the conventional art such as the limitation in the size of the mobile application executable in the mobile communication terminal, the excessive time required to receive and execute the mobile application, and the limitation in the number and the size of the mobile application due to the limited bandwidth or resource may be overcome.

MODE FOR THE INVENTION

Figure 2:
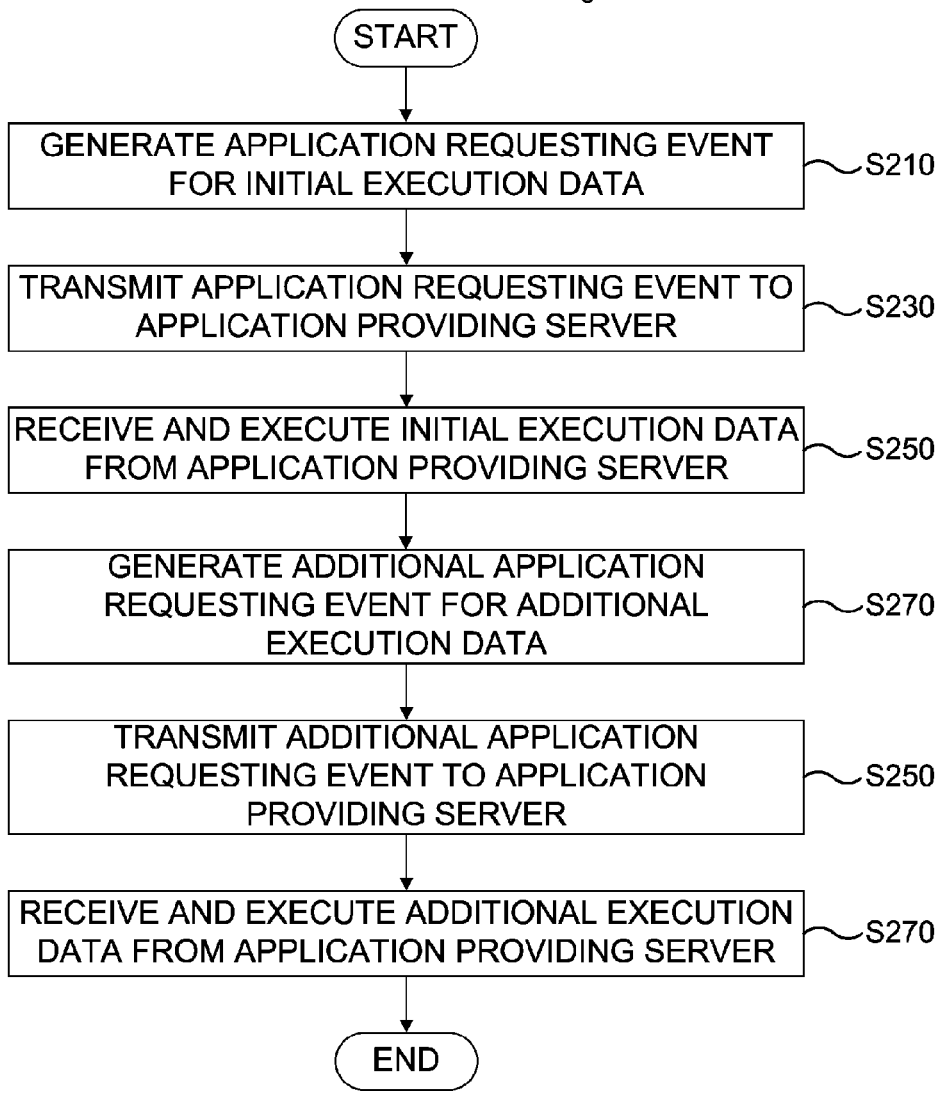
FIG. 2 is a flow diagram exemplifying another method for providing a mobile application in accordance with the present invention.

FIG. 2 is a flow diagram exemplifying another method for providing the mobile application in accordance with the present invention, wherein the method is embodied in the mobile communication terminal for receiving and providing the execution data from the mobile application providing server.

Referring to FIG. 2, the mobile communication terminal generates the application requesting event for requesting an initial execution data in order to execute the mobile application (S210).

The application requesting event is identical to the application requesting event described with reference to FIG. 1.

That is, the application requesting event may include at least one of the device identification information of the mobile communication terminal, the user identification information of the mobile communication terminal, the user input information and the identification information of the execution data.

The mobile application providing server stores the plurality of execution data divided according to the scenes of the mobile application in order to execute the mobile application. The application requesting event is an event for requesting the initial execution data of the plurality of execution data.

The initial execution data may include the executable code, the display data or the resource data for an initial screen of the mobile application, i.e. for a configuration of a screen initially displayed when the mobile application is executed.

Thereafter, the mobile communication terminal transmits the application requesting event generated in the step S210 to the mobile application providing server (S230).

That is, the mobile communication terminal transmits the application requesting event to the mobile application providing server in order to receive the desired initial execution data.

Thereafter, the mobile communication terminal receives and executes the initial execution data corresponding to the application requesting event transmitted from the mobile application providing server (S250).

The initial execution data is extracted by the mobile application providing server based on at least one of the device identification information of the mobile communication terminal, the user identification information of the mobile communication terminal, the user input information and the identification information of the execution data. The initial execution data extracted by the mobile application providing server is then transmitted to the mobile communication terminal. The mobile communication terminal then receives and executes the initial execution data in the step S250.

Contrary to the configuration of the conventional mobile application, the mobile communication terminal receives only the initial execution data instead of the entirety of the mobile application.

Thereafter, the mobile communication terminal generates an additional application requesting event for requesting the additional execution data that is required during the execution the initial execution data in the step S250. (S270)

The additional execution data is the executable code, the display data or the resource data for a screen that is to be additionally displayed to correspond to a user input while executing the mobile application based on the initial execution data in the mobile communication terminal.

While the additional application requesting event is similar to the application requesting event, the additional application requesting event differs from the application requesting event in that the additional execution data is requested instead of the initial execution data.

Thereafter, the mobile communication terminal transmits the additional application requesting event generated in the step S270 to the mobile application providing server (S280).

That is, the mobile communication terminal transmits the additional application requesting event to the mobile application providing server in order to receive a desired additional execution data.

Thereafter, the mobile communication terminal receives and executes the additional execution data corresponding to the additional application requesting event transmitted from the mobile application providing server (S290).

The additional execution data extracted by the mobile application providing server based on at least one of the device identification information of the mobile communication terminal, the user identification information of the mobile communication terminal, the user input information and a resource identification information. The additional execution data extracted by the mobile application providing server is transmitted to the mobile communication terminal, and the mobile communication terminal receives and executes the additional execution data in the step S290.

The method for providing the mobile application in accordance with the present invention is advantageous over the conventional method in the following aspects.

In accordance with the conventional method, the mobile communication terminal receives the entirety of the mobile application from the mobile application providing server as a whole. In accordance with the present invention, the mobile communication terminal receives only the required execution data from the mobile application providing server.

That is, the mobile communication terminal receives and executes the initial execution data in the step S250 to be provided to the viewer. When the mobile communication terminal requires the additional execution data, the mobile communication terminal generates the application requesting event for the required additional execution data in the step S270. The mobile communication terminal then transmits the application requesting event to the mobile application providing server in the step S280. Thereafter, the mobile communication terminal receives the corresponding additional execution data in the step S290 to be provided to the viewer.

The above-described configuration, that is, executing the initial execution data and the additional execution data for each scene, is referred to as a scene-by-scene loading hereinafter.

The conventional method is disadvantageous in that the size of the mobile application that is executable by the mobile communication terminal is limited, an excessive time is required to receive and execute the mobile application, and the number and the size of the mobile application is limited due to the limited bandwidth or the limited resource. However, in accordance with the present invention, the disadvantages are overcome by the scene-by-scene loading.

Figure 3:
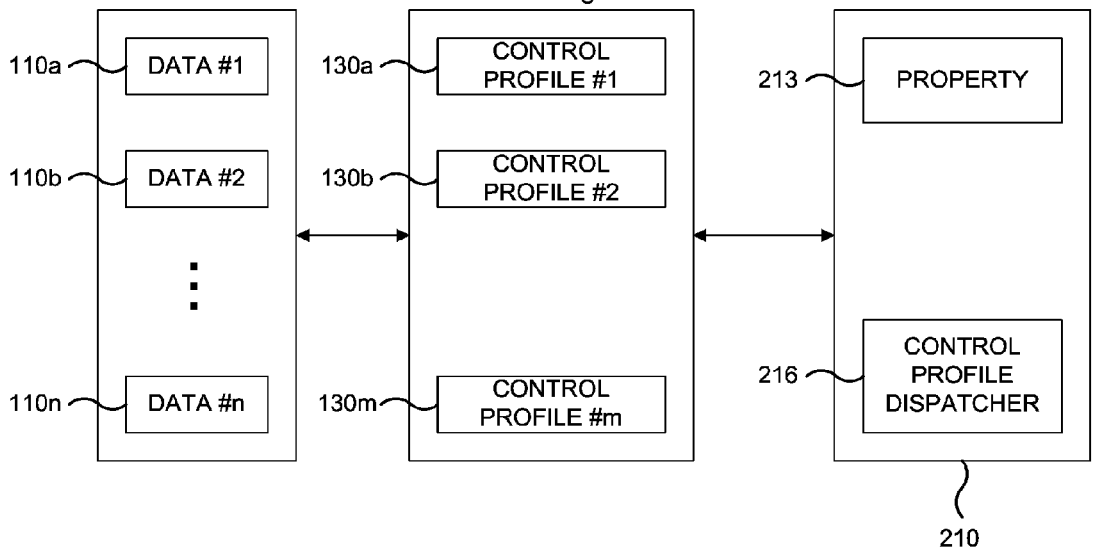
FIG. 3 is a diagram illustrating a concept of providing a mobile application between a mobile application providing server and a mobile communication terminal in accordance with a method for providing a mobile application of the present invention.

FIG. 3 is a diagram illustrating a concept of providing the mobile application between the mobile application providing server and the mobile communication terminal in accordance with the method for providing a mobile application of the present invention.

Referring to FIG. 3, a plurality of data 110a through 110n, a plurality of control profiles 130a through 130m and a model 210 are shown.

The plurality of data 110a through 110n and the plurality of control profiles 130a through 130m are embodied in the mobile application providing server.

The plurality of data 110a through 110n correspond to the execution data including the scene data or a display control data, and include the executable code, the display data or the resource data for the initial screen and the additional screen of the mobile application, i.e. the scene.

The plurality of control profiles 130a through 130m selects and provides the plurality of data 110a through 110n according to a request from the model 210.

For instance, the plurality of control profiles 130a through 130m extracts the mobile application or the execution data from the plurality of data 110a through 110n and carried out a control for a screen configuration.

The plurality of control profiles 130a through 130m extracts the mobile application for each channel or the personalized mobile application based on the device identification information or the user identification information. In addition, the configuration of the mobile application for each function is possible. Moreover, each of the plurality of control profiles 130a through 130m is capable of associating with other control profiles.

The model 210 may include a property 213 and a control profile dispatcher 216, and may be embodied in the mobile communication terminal or the mobile application providing server.

The model 210 includes an information such as a predetermined property and a predetermined specification rather than a variable property. That is, the model 210 is a configuration for processing the mobile application. The model 210 may comprise an information of a property 213 of the mobile application or a control profile dispatcher 216.

The property 213 may include an information of the execution of the mobile application. The control profile dispatcher 216 may include an information of a control of the plurality of control profiles 130a through 130m.

Figure 4:
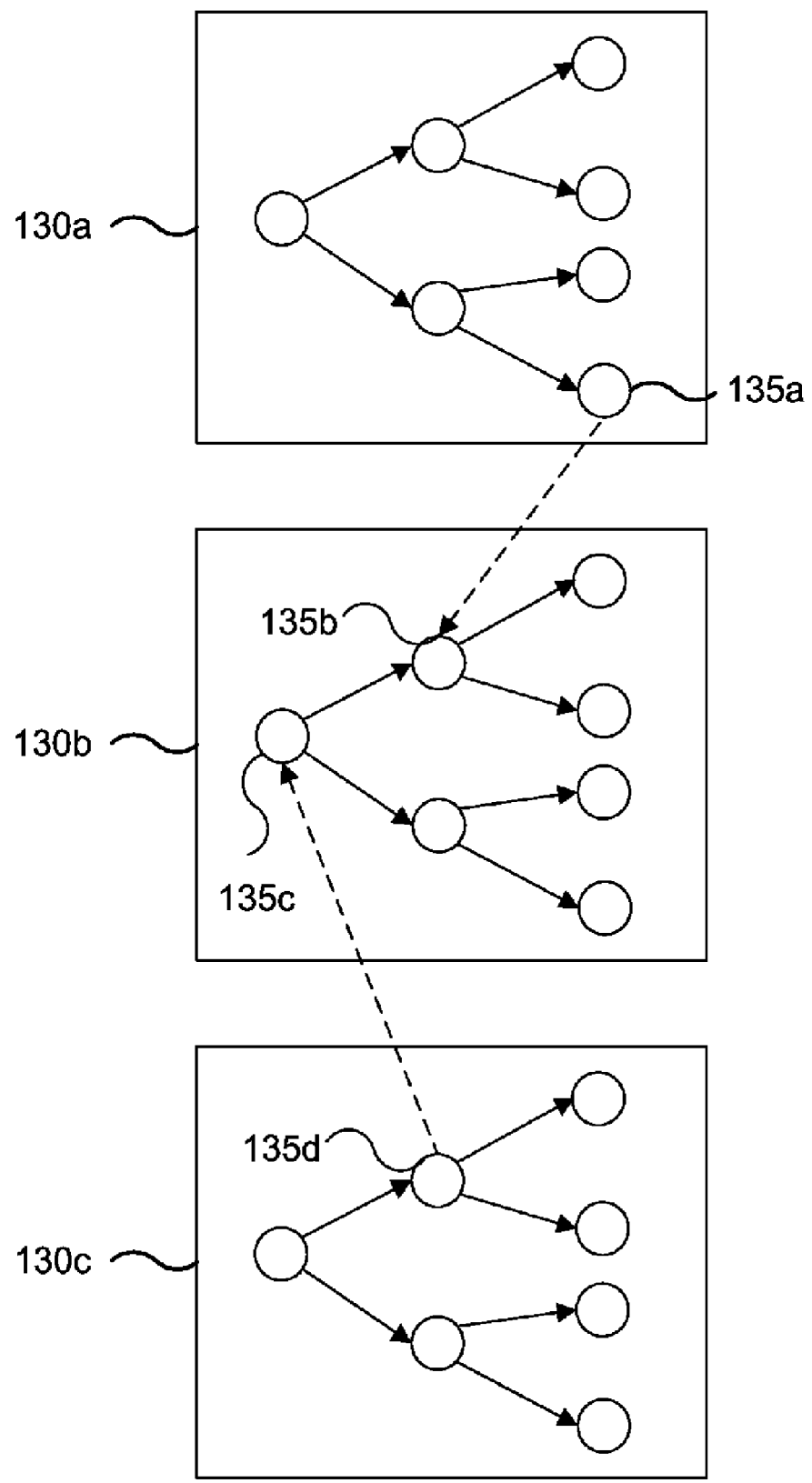
FIG. 4 is a diagram illustrating a concept of a control profile in accordance with a method for providing a mobile application of the present invention.

FIG. 4 is a diagram exemplifying the concept of the control profile in accordance with the method for providing the mobile application of the present invention.

Referring to FIG. 4, three control profiles 130a through 130c are shown.

Each of the control profiles 130a through 130c comprises a plurality of control nodes, and each of the control nodes are denoted as a circle.

For instance, let the control profile 130a be assumed as a profile for a mobile application A, the control profile 130b be assumed as a profile for a mobile application B, and the control profile 130c be assumed as a profile for a mobile application C.

In accordance with conventional art, the mobile application is executed independently.

Therefore, the mobile application A is received and executed independently of the mobile application B without the association.

However, in accordance with the present invention, the mobile application is divided into the plurality of execution data according to the scene and the mobile application is associated with each other such that the limitation of the size and the function of the mobile application are minimized.

For instance, a low-ranking control node 135a of the control profile 130a for the mobile application A may be associated with an intermediate-ranking control node 135b of the control profile 130b for the mobile application B.

In such case, while executing the mobile application A, the screen may be changed to a screen corresponding to a certain function of the mobile application B based on the user input.

This is referred to as a scene-to-scene jumping hereinafter.

Therefore, a design of providing the mobile application may be carried out by considering the function of the mobile application.

In addition, an intermediate-ranking control node 135c of the control profile 130c for the mobile application C may be associated with a top-ranking control node 135b of the control profile 130b for the mobile application B in order to enable the scene-to-scene jumping.

On the other hand, the association may be expressed through an identifier.

For instance, the control profile 130a for the channel A may be expressed as "ncfc://AppA" and the control profile 130b for the channel B as "ncfc://AppB".

In addition, the low-ranking control node 135a of the control profile 130a may be expressed as "ncfc://AppA/A/AA", and the intermediate-ranking control node 135b of the control profile 130b as "ncfc://AppB/B".

The identifier is configured to correspond to the execution data, i.e. one of the plurality of data 110a through 110n of FIG. 3.

When an event corresponding to the low-ranking control node 135a occurs, the scene-to-scene jumping to the intermediate-ranking control node 135b of the control profile 130b because the low-ranking control node 135a is associated with the intermediate-ranking control node 135b of the control profile 130b.

In order to achieve this, the low-ranking control node 135a of the control profile 130a may be linked to "ncfc://AppB/B", and the execution data corresponding to the intermediate-ranking control node 135b of the control profile 130b may thus be expressed.

The above-described configuration is useful when a company work process function is embodied using the mobile application.

For instance, a size of the conventional mobile application embodying the company work process function may be excessively large. Therefore, the mobile application may not be executed in the mobile communication terminal.

Moreover, when the mobile application is embodied, for instance, in a form of WAP, the mobile application has a poor user interface.

However, in accordance with the present invention, the company work process function may be embodied using a plurality of the mobile application, and the additional mobile application managing and associating the plurality of the mobile application. Each of the mobile applications may be divided into the plurality of execution data, and be associated to the scene through the control profile. Therefore, the company work process function may be provided by the mobile communication terminal.

While the present invention has been particularly shown and described with reference to the preferred embodiment thereof, it will be understood by those skilled in the art that various changes in form and details may be effected therein without departing from the spirit and scope of the invention as defined by the appended claims.

INDUSTRIAL APPLICABILITY

In addition, the transmission time and the loading time of the mobile application and the limitation on the number and a size of the mobile application are minimized in accordance with the method for providing the mobile application, and the personalized mobile application may be provided.

That is, the mobile application providing server stores the mobile application into the execution data corresponding to the control profile, and extracts and provides the execution data required for the execution of the mobile application based on the control profile according to the request of the mobile communication terminal. Therefore, the mobile communication terminal may carry out the scene-by-scene loading of the mobile application to minimize the time required for receiving and loading of the mobile application.

In addition, the mobile application providing server stores the mobile application into the execution data based on the plurality of control profile, and extracts the execution data corresponding to the second control profile through the scene-to-scene jumping according to the request of the mobile communication terminal and provides the extracted execution data to the mobile communication terminal. Therefore, the mobile communication terminal may provide the mobile application including the various functions through the scene-by-scene loading and the scene-to-scene jumping.

Moreover, the mobile communication terminal may minimize the transmission time and the loading time of the mobile application, and the limitation on the number and the size of the mobile application through the scene-by-scene loading and the scene-to-scene jumping.

In addition, the execution data of the mobile application to be provided to the mobile communication terminal may be selected based on the device identification information and the user identification information of the mobile communication terminal to provide the personalized mobile application.

The invention claimed is:

1. A method for providing a mobile application in a mobile application providing server for providing the mobile application, the method comprising steps of:
(a) dividing the mobile application into a plurality of execution data and storing the plurality of execution data;
(b) storing a plurality of control profiles including a plurality of control nodes represented by identifiers and corresponding to a plurality of scenarios for the application requesting event, wherein a first control node included in a first control profile of the plurality of control profiles is associated with one of: the execution data corresponding to the first control node; a second control profile of the plurality of control profiles different from the first control profile; and a second control node included in the second control profile different from the first control node;
(c) receiving an application requesting event transmitted from a mobile communication terminal, the mobile communication terminal executing and providing the mobile application;
(d) extracting one of the plurality of execution data to be provided to the mobile communication terminal, the extracted execution data corresponding to the application requesting event and based on one of the plurality of control profiles corresponding to the application requesting event; and
(e) transmitting the extracted execution data to the mobile communication terminal.

2. The method in accordance with claim 1, wherein each of the plurality of the execution data includes at least one of an executable code, a display data and a resource data for a scene of the mobile application.

3. The method in accordance with claim 1, wherein the step (c) comprises:
(c-1) receiving the application requesting event including at least one of a device identification information of the mobile communication terminal, a user identification information of the mobile communication terminal and an identification information of the execution data.

4. The method in accordance with claim 3, wherein the step (d) comprises (d-1) extracting one of the plurality of the execution data based on at least one of the device identification information, the user identification information and the identification information of the execution data.

5. The method in accordance with claim 1, wherein the control node includes an identification information for one of the plurality of the execution data.

6. The method in accordance with claim 1, wherein each of the plurality of the control profiles or each of the plurality of the control nodes is represented by an identifier, and the association is represented in a form of a link to the identifier.

7. A method for receiving a mobile application in a mobile communication terminal for receiving the mobile application, the method comprising steps of:
(a) generating an application requesting event corresponding to an initial execution data of the mobile application for executing the mobile application and based on an initial control profile of a plurality of control profiles corresponding to the application requesting event;
(b) transmitting the application requesting event to a mobile application providing server for providing the mobile application;
(c) receiving the initial execution data corresponding to the application requesting event from the mobile application providing server and executing the received initial execution data;
(d) generating an additional application requesting event for requesting an additional execution data required during the execution of the initial execution data and based on an additional control profile of a plurality of control profiles corresponding to the additional application requesting event;
(e) transmitting the additional application requesting event to the mobile application providing server; and
(f) receiving the additional execution data of the mobile application corresponding to the additional application requesting event from the mobile application providing server and executing the received additional execution data,
wherein the plurality of control profiles includes a plurality of control nodes represented by identifiers and corresponding to a plurality of scenarios for the application requesting event, and
wherein a first control node included in a first control profile of the plurality of control profiles is associated with one of: the execution data corresponding to the first control node; a second control profile of the plurality of control profiles different from the first control profile; and a second control node included in the second control profile different from the first control node.

8. The method in accordance with claim 7, wherein each of the application requesting event and the additional application requesting event includes at least one of a device identification information of the mobile communication terminal, a user identification information of the mobile communication terminal and an identification information of the execution data.

9. The method in accordance with claim 7, wherein the initial execution data includes at least one of an executable code, a display data and a resource data for an initial screen of the mobile application.

10. The method in accordance with claim 7, wherein the additional execution data includes at least one of an executable code, a display data and a resource data for an additional screen to be displayed according to a user input during the execution of the mobile application based on the initial execution data.

* * * * *